(12) United States Patent
Yalla et al.

(10) Patent No.: US 7,468,593 B2
(45) Date of Patent: Dec. 23, 2008

(54) DIGITAL SYSTEM FOR MOTOR BUS TRANSFER

(75) Inventors: Murty V. V. S. Yalla, Palm Harbor, FL (US); Chengbin Hou, Clearwater, FL (US)

(73) Assignee: Beckwith Electric Co., Inc., Larco, FL (US)

( * ) Notice: Subject to any disclaimer, the term of this patent is extended or adjusted under 35 U.S.C. 154(b) by 103 days.

(21) Appl. No.: 11/599,128

(22) Filed: Nov. 14, 2006

(65) Prior Publication Data

US 2008/0111507 A1 May 15, 2008

(51) Int. Cl.
*G05B 19/29* (2006.01)
(52) U.S. Cl. .......................... 318/600; 318/632; 702/57
(58) Field of Classification Search ................. 318/139, 318/105, 600, 632; 702/57, 59, 60
See application file for complete search history.

(56) References Cited

U.S. PATENT DOCUMENTS

| | | | | |
|---|---|---|---|---|
| 4,310,771 A | * | 1/1982 | Wyatt et al. ................... 307/64 |
| 4,356,972 A | * | 11/1982 | Vikre .......................... 239/173 |
| 5,224,011 A | * | 6/1993 | Yalla et al. .................. 361/93.2 |
| 6,397,155 B1 | * | 5/2002 | Przydatek et al. ............. 702/61 |
| 6,845,333 B2 | * | 1/2005 | Anderson et al. ............. 702/65 |

* cited by examiner

*Primary Examiner*—Rina I Duda
(74) *Attorney, Agent, or Firm*—Leo J. Aubel

(57) ABSTRACT

In industrial complexes and power stations a main source of power is connected to a motor bus to which motors and other loads are connected. In such systems an auxiliary source of power is provided to alternatively provide electric energy to the motor bus should the main source of power be interrupted. In the prior art digital system, samples are taken of the motor bus and auxiliary system voltage waveform with a fixed time window to predict the proper time for closing the breaker. The present invention improves on the prior art by applying the concept of an adaptive time window wherein the number of samples taken during each cycle to obtain the operating parameters is increased as the frequency decreases. This provides more accurate parameters for calculating the point for closing.

7 Claims, 4 Drawing Sheets

DIGITAL SYSTEM FOR MOTOR BUS TRANSFER

BACKGROUND OF INVENTION

This patent application is related to a digital system for providing motor bus transfers, and is generally related to U.S. Pat. Nos. 4,310,771; 4,356,972 relating to methods and hardware for transferring power supplied to motors in a synchronous mode from a main utility source to an auxiliary source and assigned to the same assignee as the present invention. The foregoing cited patents disclose analog systems. This patent application is also closely related to U.S. Pat. No. 5,224,011 that discloses a digital system that is a predecessor of the system disclosed in the present application.

In power plant applications the motor load is transferred from auxiliary source to the main source and vice versa during starting and shut-down of the power plant. It is important to minimize motor power interruption time to prevent dropping of this motor load. Also, the transfer of the motor bus from one source to the other should be carried out in a synchronous manner to prevent motor damage.

Voltage sags or total supply interruptions represent a prevalent and critical problem in providing quality energy to industrial loads. Voltage disturbances or interruptions of electronic control systems and other sensitive installations can lead to complete loss of production in a factory facility. Also, it is important to maintain continuity of electric service to industrial facilities such as chemical and petroleum facilities. An outage of service has enormous detrimental consequences. Accordingly, such industrial facilities are normally connected to a main source of utility power and to an auxiliary source of power. When the main source is interrupted or cut off, the motor loads are transferred from the main source to an auxiliary source to provide energy to the motors and other loads. This application describes a new digital system for automatically transferring the motor load from the main source to the auxiliary source with no interruption or motor damage that is when the main source is interrupted the motors are synchronously connected to an auxiliary source.

It is known that when disconnected from a source of energy, rotating equipment will decelerate at a rate which is a function of the initial rotational inertia and the retarding torque. Considering that a typical motor bus has a combination of motor loads connection thereto, the deceleration of the total system becomes a complex function of the total system inertia, the time constants of the individual motor loads, the trapped flux in each machine, as well as the individual characteristics of each machine. As a result, the total motor bus may be viewed as an equivalent machine decelerating at a composite rate. The frequency of the residual voltage present on the motor bus during the de-energized transfer period will decay at a rate determined by a complex "average" of the spectrum of parameters associated with the motor bus. The system frequency will decay as the stored energy is dissipated by the load.

It is known that the determination of the time when the breaker should be closed involves measuring the phase difference between the motor bus voltage and the auxiliary source voltage; calculating the time derivative of the phase difference to obtain the frequency difference; and, correlating these functions. A prediction of zero phase difference is made; and, knowing the breaker closing time, a phase difference point can be calculated at which point it is desirable to initiate the closing of the breaker.

SUMMARY OF THE INVENTION

In industrial complexes and power stations a main source of power is connected to a motor bus to which motors and other loads are connected. In such systems an auxiliary source of power is provided to alternatively provide electric energy to the motor bus should the main source of power be interrupted. This application discloses a digital system operating at high speed for the changeover or transfer of power coming from a main source to power coming from the auxiliary source.

The foregoing features and advantages of the present invention will be apparent from the following more particular description of the invention. The accompanying drawings, listed herein below, are useful in explaining the invention.

As mentioned, U.S. Pat. No. 5,224,011 discloses a digital system for calculating magnitude and phase angles of a sampled voltage signal. Data samples of the voltage waveform are taken to provide an indication of the instantaneous phase angle and magnitude of the voltage waveform; the waveform will be decaying in amplitude and slowing down due to the interruption of the main source. Computations are made based on these samples to provide the proper breaker closing point. The technique described in U.S. Pat. No. 54,224,011 uses a constant sampling rate and fixed number of samples (fixed time window) per fundamental frequency (50 or 60 Hz) cycle of power system. The technique suffers from unacceptable errors in calculating voltage magnitude and phase angle when the frequency deviates from nominal value.

The present invention uses two different techniques to improve the accuracy based on the type of measurement that is used. For three phase voltage measurement it uses the positive sequence voltage phasor for the motor bus voltage to reduce errors due to frequency variation. The magnitude and phase angle of the positive sequence phasors do not vary with time and it is accurate over a wide frequency range (50 Hz to 70 Hz for a nominal 60 Hz system).

When single phase voltage measurement is used it uses an inventive technique by varying the number of samples (adaptive time window) in the measurement window based on the measured frequency. Since the sampling rate is constant the measurement window time is increased by increasing the number of samples in the window as the frequency decreases. Since the motor bus voltage and the auxiliary source voltage have two different frequencies these two voltage and phase angle calculations use two different window lengths (two different rotating references) based on their fundamental frequencies.

The foregoing features and advantages of the present invention will be apparent from the following more particular description of the invention. The accompanying drawings, listed herein below, are useful in explaining the invention.

DRAWINGS

DESCRIPTION OF INVENTION

The present invention improves on the prior art by applying a concept for calculating the phase angle and magnitude of the voltage signals to determine the breaker closing angle wherein the number of samples taken during each cycle to obtain the operating parameters is increased as the frequency decreases. This provides more accurate parameters for calculating the point for initiation of closing. Broadly stated and for example, assume that initial frequency of the waveform is 60 Hz and 32 samples are taken per cycle. When the power to the motor bus is interrupted, the frequency to the motor bus decreases over a short period to say, 55 Hz. Accordingly, the time period of each cycle increases and hence by taking only 32 samples will not give full cycle of waveform. The phase angle calculated for this partial cycle of waveform using discrete Fourier transform will suffer from large errors. This in turn will introduce errors into a predicted and desired zero crossing and closing point. Said in another way, in order to get accurate voltage magnitude and phase angle the number of samples used for the DFT calculation is such that it represents as close to full cycle of the fundamental frequency of the motor bus voltage as possible. To reiterate, the additional samples will provide a more accurate data as to the true magnitude and phase angle of the waveform from which to determine the predicted closing point. Accordingly the method of the invention provides a more accurate method of obtaining a smooth connection of the motor bus to the auxiliary power system.

Figure 1:
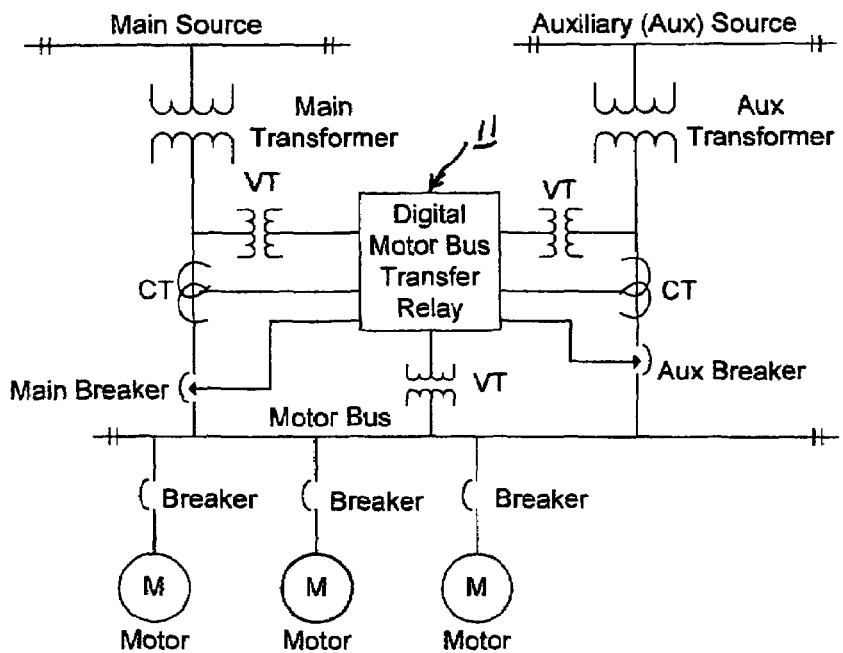
FIG. 1 is a line drawing of a utility network connecting to a motor bus and having a back-up auxiliary system also connected to the motor bus.

Refer now to FIG. 1 that shows a hardware block diagram of a digital motorbus transfer system. The block diagram of FIG. 1 depicts major components and subsystems of the Digital Motorbus Transfer System (DMTS) 11 of the invention. The concept of a digital multifunction relay and calculation of voltage magnitude and phase angle using discrete Fourier transform has been generally described as part of the overall system disclosed in U.S. Pat. No. 5,224,011 issued in the name of Murty Yalla et al. This present invention discloses an improved system, the Beckwith motor bus transfer system M-4272; the M-4272 provides an improvement to the operating software and hardware disclosed in U.S. Pat. No. 5,224,011. In patent '011, the disclosed system utilized two microprocessors, one for providing control and communications and the other providing the signal processing. The DMTS 11 of this invention also uses two microprocessors but the signal processing and control logic are implemented on one microprocessor (Digital Signal Processor (DSP), 13) where as the second microprocessor 12 is mainly used for communications and user interface. The digital signal processor and the other microprocessor communicate through a dual-ported memory 15. The DMTS also uses analog-to-digital converter (ADC) 14, as well as a known random access memory 15, a read only memory 17, a flash memory 19, and an EEPROM 18.

The DMTS 11 is normally connected to a three-phase electrical system is indicated in FIG. 1. The voltages (Va, Vb and Vc) and currents (I) are suitably scaled and isolated, at the relay input circuit 16 using auxiliary voltage transformers and current transformers, as is known. Anti-aliasing low-pass filters (LPF) 21 are provided for each of the inputs for the purpose of avoiding aliasing or the incorrect assimilation or interpretation of harmonic frequency components in the DMTS 11. The DMTS 11 utilizes a high sampling rate which allows simpler and less expensive anti-aliasing filters to be used. The current input channels 22 receive and enable accurate measurements of current signals for providing breaker failure function and also providing metering and oscillography.

The outputs from the auxiliary transformers 16 are coupled to an analog multiplexer 24 that multiplexes or time-shares the values from the various analog inputs to the digital portion of DMTS 11. The output of the multiplexer is coupled through the ADC 14 to DSP 13.

The DSP 13 makes many calculations in a very limited time in order to accomplish all functions in real time. Digital techniques used and applied in and by the microprocessor 13, based on the discrete Fourier transform algorithms, described hereinafter, efficiently extract the information from the voltage and current signals that are used by the DMTS 11 to perform its various functions.

The system includes an LCD Display and Front-Panel Controls 26 for operator interface. The breaker status and other contact inputs 33 are connected to the microprocessor 12 after optically isolating them to prevent damaging electrical signals from entering via the contact input circuitry. The relay outputs 35 include the trip and close relay outputs, programmable relay outputs which can be programmed to be activated for various conditions. Also, self-test failure output contact which will be activated whenever an internal problem in the DMTS 11 is detected by the self-test software. The DMTS also includes serial communications ports 27 and Ethernet port 28 for communicating to the outside world. The status of the DMTS is indicated with LED targets 28. A known type of power supply is indicated at 43.

Figure 2:
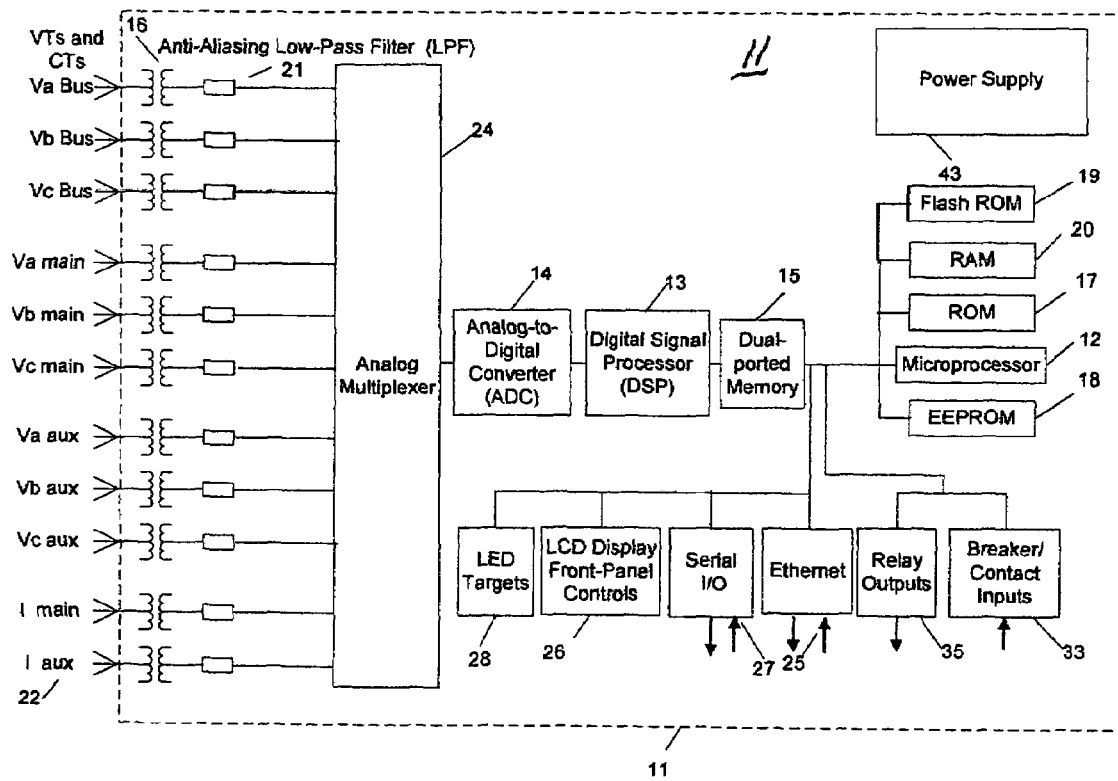
FIG. 2 is a block diagram of the digital motor bus transfer (DMBT) system according to a preferred embodiment of the present invention.
Figure 3:
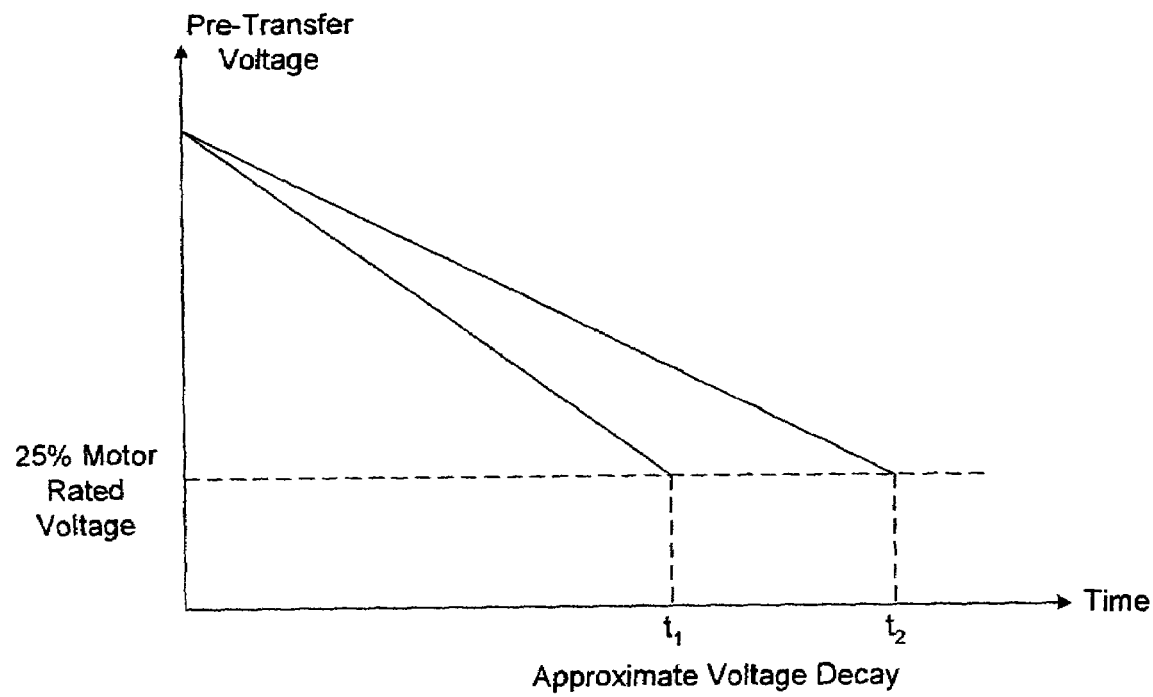
FIG. 3 is a graph generally showing the voltage decay on the motor bus for two different systems after interruption of the utility source.

One of the important functions that the DMTS 11 provides is that of automatically transferring the electrical motor load from the main source to the auxiliary source in a fast, synchronous and smooth manner and with no motor damage when the main source is interrupted or disconnected. FIG. 2 indicates the motor bus residual decay, and can be approximated as a straight line down to at least 25% value of motor rated voltage. The points t1 and t2 represent the time intervals for two different motor loads, of different characteristics, and accordingly, it becomes impractical to predict what the voltage decay rate will be at any time since the load combination on the motor bus is transient and variable.

The phase angle information is obtained once every half a cycle in the analog motor bus system as detailed in U.S. Pat. Nos. 4,310,771; 4,356,972. As mentioned above, U.S. Pat. No. 5,224,011 to Yalla et al utilizes digital processing techniques to improve the signal processing response time from half a cycle to once every sample. The digital techniques also improve the accuracy of the measurements. The present invention provides additional novel techniques for further refining and improving both the accuracy of the measurement and the signal processing time, as will subsequently be described.

The DMTS has several modes of operation and based on the prevailing conditions it selects the best operating mode. The DMTS has the capability to perform sequential (waits until the tripped breaker is opened as indicated by the breaker status contact) or simultaneous transfer.

When a transfer is initiated the DMTS sends a signal to trip the main source breaker and checks to see if a fast transfer is possible. This is accomplished by checking the phase angle and magnitude differences between the motor bus and the auxiliary source voltages. If the phase angle and magnitude differences are within limits and the main breaker contact indicates that the breaker has opened (in sequential mode) it then sends a signal to close the auxiliary source breaker.

If the phase angle or the magnitude decays rapidly and crosses the set limits for fast transfer (by the time the main breaker opens) then it checks for the in-phase transfer. This is accomplished by waiting for the phase angle to go through 180 degrees and moves towards zero. By knowing the breaker closing time, delta phase angle, delta frequency and rate of change of delta frequency the precise time at which the breaker closing signal to be sent (so that the breaker will close at zero phase angle difference) can be calculated. Since the frequency decay is not a linear function, utilizing rate of change of delta frequency along with delta frequency will give more accurate prediction of zero phase angle closing.

If the phase angle or the magnitude of the motor bus voltage changes rapidly so that either a fast transfer or an in-phase transfer is not possible then a residual transfer is attempted. This is accomplished by waiting for the motor bus voltage to reach below a set value and sending a signal to close the auxiliary source voltage.

The DMTS also provides provisions to shed load before attempting a fast transfer, in-phase transfer or a residual transfer so that the motor bus voltage decay can be slowed down to make these transfers possible.

The DMTS has a breaker failure monitoring function using either the current through the breaker or the breaker status contact. A breaker is considered failed when either the current through the breaker has not gone to zero or the breaker status contact indicates that the breaker is still closed. If a failure of the main breaker is detected then the auxiliary breaker is also tripped to avoid paralleling of both sources.

The DMTS also has an under voltage, under frequency and rate of change of frequency functions. Any one of these functions can be used to initiate a transfer, shed load or send an alarm. Unlike the analog under voltage relays DMTS under voltage function has a fast response time of one cycle. Also, the rate of change of frequency can give an early indication of the problem with the source rather than waiting for the under voltage to send a transfer signal.

A voltage transformer fuse failure algorithm is implemented in the DMTS. It can be used to enable a fixed time transfer mode where a fixed amount of time is waited after the tripping of the main source and before sending the close command to the auxiliary breaker so that the motor bus voltage would have decayed to below the residual voltage limit.

Brief Description of Algorithms:

Motor bus transfer systems require the measurement of voltage magnitude and phase angle of main source, auxiliary source and the motor bus.

The voltage magnitude and phase angle are computed using a discrete Fourier transform (DFT) algorithm as given below:

If we write the equation of the DFT which computes only the fundamental frequency component and if we scale the complex phasor to represent the peak value of the sinusoid, the equation becomes $$Z = \frac{2}{N} \sum_{k=0}^{N-1} z_k e^{(-j2\pi k)/N} \quad (1)$$

The real (ZR) and imaginary (ZI) components of the fundamental frequency phasor are given by $$ZR = \frac{2}{N} \sum_{k=0}^{N-1} z_k \cos\frac{2\pi k}{N} \quad (2)$$

$$ZI = \frac{2}{N} \sum_{k=0}^{N-1} z_k \sin\frac{2\pi k}{N} \quad (3)$$

The above equations can be rewritten in a recursive form to reduce the computations as follows:

$$ZR_k = ZR_{k-1} + \frac{2}{N}(z_k - z_{k-N})\cos\frac{2\pi k}{N} \quad (4)$$

$$ZI_k = ZI_{k-1} + \frac{2}{N}(z_k - z_{k-N})\sin\frac{2\pi k}{N} \quad (5)$$

where $z_{-1}, z_{-2}, \ldots z_{-N}$, $ZR_{-1}$ and $ZI_{-1}$ are set to zero.

It is evident from (4) and (5) that it requires only two multiplications at each sample. Also the use of (4) and (5) would result in a stationary phasor in contrast to the use of (2) and (3) which would result in a rotating phasor.

The peak value of the fundamental frequency phasor is given by $$Z_P = \sqrt{ZR^2 + ZI^2} \quad (6)$$

and the RMS value is given by $$Z_{RMS} = \frac{Z_P}{\sqrt{2}} \quad (7)$$

The phase angle is given by $$\theta = \tan^{-1}\left(\frac{ZI}{ZR}\right) \quad (8)$$

When three phase voltages are available for the DMTS then positive sequence voltage measurements are used for the magnitude and phase angle calculation as this gives more accurate measurements of voltage magnitude and phase angle.

The positive sequence voltage phasor ($\vec{V}_{ps}$) is computed using the voltage phasors from phase a ($\vec{V}_a$), phase b ($\vec{V}_b$) and phase c ($\vec{V}_c$) as follows:

$$\vec{V}_{ps} = (\vec{V}_a + \vec{V}_b e^{j\Phi} + \vec{V}_c e^{-j\Phi})/3 \quad (9)$$

where $\Phi = 2\pi/3$.

The positive sequence voltage is computed every $1/16^{th}$ of a cycle in the present implementation but any other appropriate time step can be used. In the case of a single phase voltage measurement only the phasor from the connected phase is used instead of the positive sequence voltage phasor and the DFT algorithm is modified based on the adaptive time window as described later.

Once the phasors (positive sequence or single phase) of bus ($VR_{bus} + jVI_{bus}$) and the auxiliary source ($VR_{aux} + jVI_{aux}$) voltages are calculated the delta phase angle ($\Delta\theta$) between the bus and the auxiliary source voltage at the present instant can be calculated using the following equation:

$$\Delta\theta = \arctan((VI_{bus}VR_{aux} - VR_{bus}VI_{aux})/(VR_{bus}VR_{aux} + VI_{bus}VI_{aux})) \quad (10)$$

The delta frequency between the bus and auxiliary source voltages is calculated using the rate of change of the delta phase angle as follows:

$$\Delta f = \frac{1}{2\pi}\frac{(\Delta\theta - \Delta\theta')}{T} \quad (11)$$

where $\Delta\theta'$ is the delta phase angle at the previous measurement, T is the time interval in sec between the two measurements.

The delta frequency is averaged over a period of $T_{ave}$ to filter the noise in the measurements. Assuming the rate of change of delta frequency $(d(\Delta f_{ave})/dt)$ is constant, the average delta frequency $\Delta f_{ave}$ is at the middle of the $T_{ave}$ window. The delta frequency at the present instant $(\Delta f_e)$ can be estimated using the $\Delta f_{ave}$, $T_{ave}$ and $d(\Delta f_{ave})/dt$ as follows:

$$\Delta f_e = \Delta f_{ave} + \frac{T_{ave}}{2}\frac{d(\Delta f_{ave})}{dt} \quad (12)$$

The phase angle at the instant of breaker closing $(\Delta\theta_P)$ can be predicted using the estimated delta frequency $\Delta f_e$, the rate of change of delta frequency and the breaker closing time $(T_B)$ as follows:

$$\Delta\theta_P = \Delta\theta + 2\pi\left(\Delta f_e + \frac{1}{2}d\left(\frac{\Delta f_{ave}}{dt}\right)\cdot(T_B)\right)\cdot T_B \quad (13)$$

When the motor bus is disconnected from the main source, the frequency of the motor bus decays rapidly. The phase angle calculated with only delta frequency and breaker closing time will suffer from large errors. The use of rate of change of delta frequency in the prediction of phase angle at the instant of breaker closing in equation (13) will greatly reduce these errors as the delta frequency is not constant during this period.

When three phase bus voltages are available the DMTS uses positive sequence voltage to calculate the magnitude and phase angle as described above. These values are accurate over a wide frequency range (ex: 50 to 60 Hz for a 60 Hz nominal frequency). When only single phase bus voltage is available the magnitude and phase angle calculation is not accurate enough for motor bus transfer application when the frequency deviates from the nominal value. For single phase voltage input applications an adaptive window DFT algorithm as described below is applied in this invention.

Adaptive Time Window DFT Algorithm

When the present source is disconnected the frequency of the motor bus voltage can deviate appreciably from the nominal value and it can affect the accuracy of the magnitude and phase angle calculation when a single phase voltage measurement is used. In order to reduce the inaccuracy the magnitude is calculated using an RMS calculation algorithm (time domain) instead of the DFT algorithm.

Figure 4:
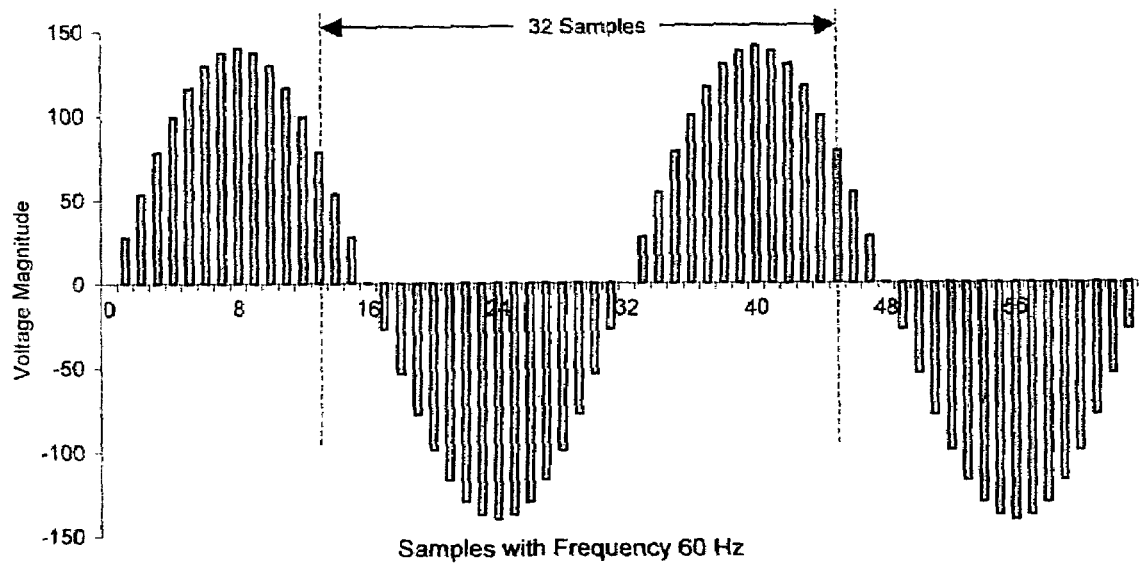
FIG. 4 shows the sampled voltage signal at 60 Hz (32 samples)
Figure 5:
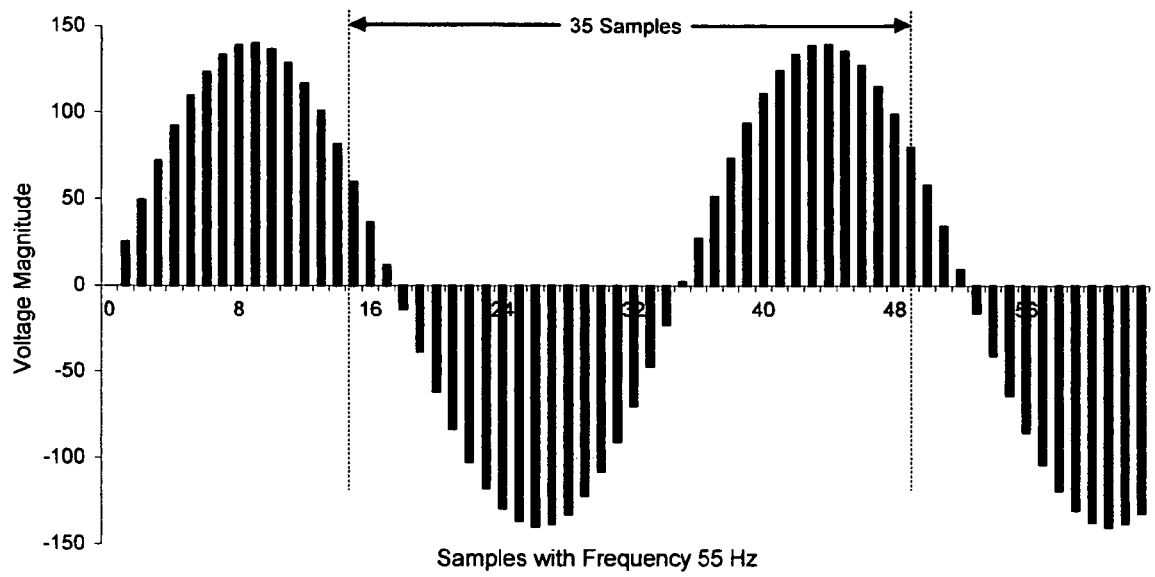
FIG. 5 shows the sampled voltage signal at 55 Hz (measurement window increased to 35 samples)

Refer now to FIG. 4 which shows the sapling of a 60 Hz voltage signal at 1.92 kHz (32 times 60). Also, FIG. 5 shows the sampling of 55 Hz voltage signal at 1.92 kHz (32 times 60). As you can see when the frequency deviates from nominal value the number of samples in one cycle window is increased from 32 (for 60 Hz signal) to 35 (for 55 Hz signal). Therefore taking only 32 samples for a 55 Hz signal does not include full cycle of the waveform and hence the magnitude and phase angle calculated using DFT from this partial waveform suffers from inaccuracies.

Figure 6:
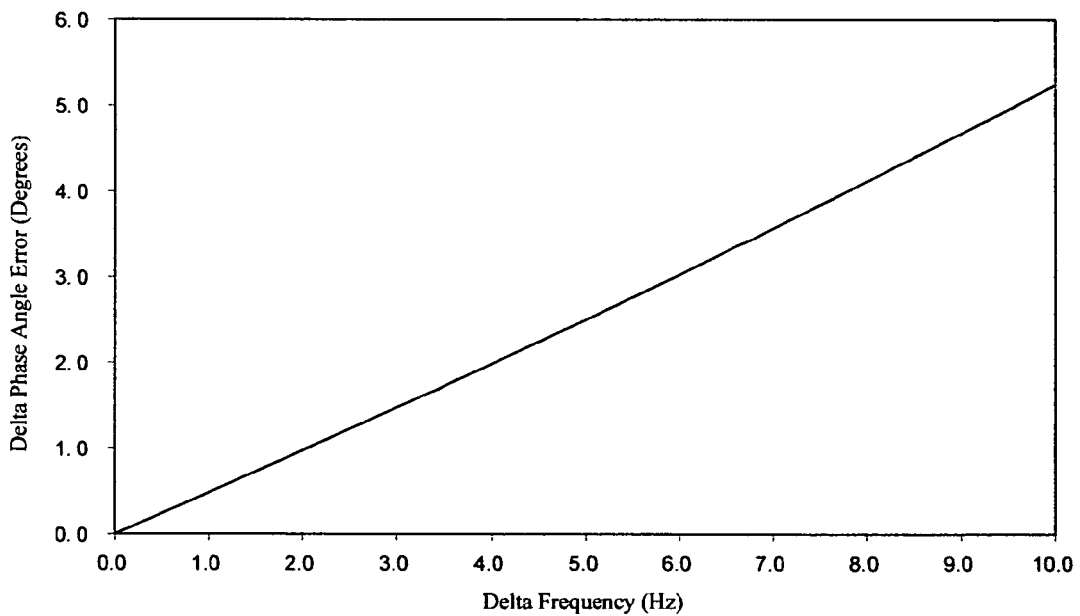
FIG. 6 shows the delta phase angle measurement error using a standard DFT algorithm.

Refer now to FIG. 6 that shows the delta phase angle measurement error with a standard DFT for a delta frequency of 0 to 10 Hz. These results are obtained using a 32 sample window for a bus frequency of 60 Hz to 50 Hz with the auxiliary source fixed at 60 Hz. As it can be seen from FIG. 6 the delta phase angle error increases from 0 to 5.25 degrees as the bus frequency is decayed from 60 Hz to 50 Hz.

The present invention provides an adaptive time window for taking samples of the voltage waveform that is automatically adjusted, based on the measured frequency. As mentioned above, the invention introduces the concept of utilizing an adaptive time window algorithm that increases the measurement sample window as the frequency decreases. Several discrete frequency steps are used by increasing the time window to enable an increase from 32 samples per cycle to 38 samples per cycle. That is, the measurement window is increased in integral steps of 32, 33, 34, 35, 36, 37 to 38 samples as the frequency is decreasing from 60 Hz to 50 Hz. Total of 7 recursive DFT calculations are implemented one for each of the sample window lengths in parallel and the appropriate phasors are selected based on the measured frequency.

Refer back to FIG. 4 that shows 32 samples of the voltage waveform when the frequency is at 60 Hz. The system is programmed to increase the number of samples taken during each cycle as the frequency decreases. As an example, FIG. 5 shows that at a frequency of 55 Hz the data window length of 35 samples is selected. The fundamental frequency of time window is determined as:

$$f = \frac{N}{M}f_0, \quad (14)$$

where N is the time window (32 samples in this example) for a nominal frequency (60 Hz in this example) voltage waveform and M is the time window in samples which varies from 32 to 38 based on the measured bus frequency. The time window samples for the bus voltage will increase as the bus frequency is decaying. That means that the bus voltage and the new source voltage may use different rotating references to obtain phasors. This introduces an error in the delta phase angle which can be calculated as follows:

$$\Delta\theta_{error}(i) = \frac{2\pi(M_{aux} - M_{bus})}{M_{bus}\cdot M_{aux}}i, \quad (15)$$

where $M_{aux}$ and $M_{bus}$ are the time window in samples of the auxiliary source and bus voltage and index 'i' represents the sample number.

The corrected delta phase angle $(\Delta\theta_c)$ between the bus and the new source voltage can be calculated by using auxiliary source and bus voltage phasors (as given by equation (10)) along with the compensation for delta phase angle error (as given by equation (15)) as follows:

$$\Delta\theta_c = \Delta\theta + \Delta\theta_{error} \quad (16)$$

Figure 7:
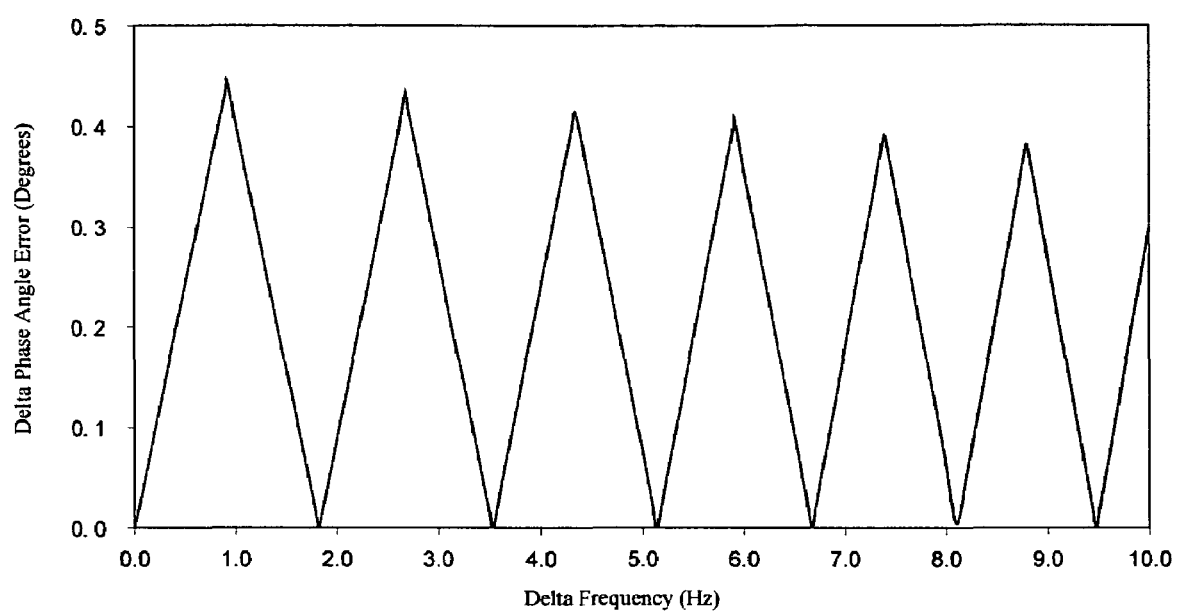
FIG. 7 shows the delta phase angle measurement error using adaptive time window DFT algorithm.

FIG. 7 shows the delta phase angle measurement error using the adaptive time window DFT algorithm in accordance with the invention. Note that the inclusion of data from the increased number of samples enables the delta angle error to be maintained within a very narrow range, 0.45 degrees (in this example). This is an improvement of over 1166%.

While the invention has been particularly shown and described with reference to preferred embodiments thereof, it will be understood by those skilled in the art that various changes in form and details may be made therein without departing from the spirit and scope of the invention.

The invention claimed is:

1. In a three phase power supply network wherein a main source of power and an auxiliary source of power are alternatively connected to a motor bus, a digital system for transferring power from said auxiliary source to said motor bus when the supply from said main source is interrupted, a method comprising:
   a. taking samples of said motor bus waveform at a selected rate of samples per cycle of an operating power frequency;
   b. utilizing data from said samples to calculate the instantaneous difference in voltage magnitude and phase angle between said motor bus waveform and auxiliary waveform;
   c. sensing the decaying frequency on said motor bus;
   d. increasing the number of samples per frequency cycle as the motor bus frequency decreases to obtain an increased number of data samples per cycle;
   e. calculating the projected closing point or actual transfer of voltage source dependent on the data obtainable from said total number of samples; and
   f. actuating said transfer relay to close at the closing point.

2. A method as in claim 1 where the delta phase angle error is corrected due to the two different rotating references being used for the discrete Fourier transform algorithm.

3. A method as in claim 1 where the closing point is a predicted and determined based on;
   e.1 delta phase angle between the motor bus and the auxiliary source voltages;
   e.2 delta frequency between the motor bus and the auxiliary source voltages;
   e.3 rate of change of delta frequency between the motor bus and the auxiliary source voltages and a digital control d. breaker closing time.

4. A three phase power supply network having a main source of power, and auxiliary source of power comprising motors, a motor bus and a digital control system for transferring power from said auxiliary source to said motor bus when the supply from said main source is interrupted comprising:
   a. means for taking samples of said motor bus waveform at a selected rate of samples per cycle of an operating power frequency;
   b. means for utilizing data from said samples to calculate the instantaneous difference in phase angle between said motor bus waveform and auxiliary source waveform;
   c. means for sensing the decaying frequency on said motor bus;
   d. means for increasing the number of samples per frequency cycle as the motor bus frequency decreases to obtain an increased number of data samples per cycle;
   e. means for calculating the projected closing point dependent on the data obtainable from said total number of samples.

5. In a three phase power supply network wherein a main source of power and
   an auxiliary source of power are alternatively connected to a motor bus, a digital system for transferring power from said auxiliary source to said motor bus when the supply from said main source is interrupted, a method comprising:
   a. taking samples of said motor bus waveform at a selected rate of samples per cycle of an operating power frequency;
   b. utilizing data from said samples and calculating the positive sequence voltage phasor of the motor bus and the voltage phasor of the auxiliary source voltage;
   c. utilizing the said positive sequence voltage phasor and auxiliary source voltage phasor to determine the magnitude and phase angle difference between these said phasors;
   d. calculating the projected closing point or actual transfer of voltage source dependent on the data obtainable from the said magnitude and phase angle difference;
   e. actuating said transfer relay to close at the closing point.

6. A method as in claim 4 where the closing point is a predicted and determined based on,
   d.1 delta phase angle between the motor bus and the auxiliary source voltages;
   d.2 delta frequency between the motor bus and the auxiliary source voltages;
   d.3 rate of change of delta frequency between the motor bus and the auxiliary source of phasors voltages; and
   d.4 breaker closing time.

7. A three phase power supply network having a main source of power, an auxiliary
   source of power comprising motors, a motor bus, a transfer relay and a digital control
   system for transferring power from said auxiliary source to said motor bus when the supply from said main source is interrupted comprising:
   a. means for taking samples of said motor bus waveform at a selected rate of samples per cycle of an operating power frequency;
   b. means for utilizing data from said samples to calculate the positive sequence voltage phasor of the motor bus and the voltage phasor of the auxiliary source voltage
   c. means for utilizing the said positive sequence voltage phasor and auxiliary voltage phasor to determine the magnitude and phase angle source voltage phasor to determine the magnitude and phase angle difference between these said phasors;
   d. means for calculating the projected closing point dependent on the data obtainable from said total number of samples.

* * * * *